United States Patent Office 3,088,949

Patented May 7, 1963

1

3,088,949

NEW DYESTUFFS

Eduard Moser, Bottmingen, and Jacob Koch, Basel, Switzerland, assignors to Ciba Limited, Basel, Switzerland, a Swiss company No Drawing. Filed Dec. 6, 1960, Ser. No. 73,968

Claims priority, application Switzerland Dec. 8, 1959

1 Claim. (Cl. 260—281)

This invention provides dyestuffs of the general formula

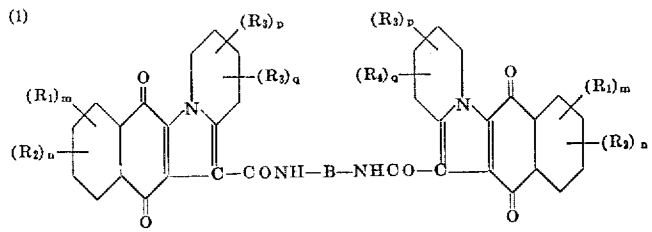

in which $R_1$, $R_2$, $R_3$ and $R_4$ each represent a hydrogen atom or a substituent not imparting solubility in water, or $R_1$ and $R_2$ or $R_3$ and $R_4$ when in ortho-position relatively to each other may together with the vicinal carbon atoms to which they are bound form a ring, *m*, *n*, *p* and *q* each represent the whole number 1 or 2, and B represents an aromatic radical which consists of at least two carbocyclic rings condensed together and is free from groups imparting solubility in water.

The invention also provides a process for the manufacture of the dyestuffs of the above Formula 1, wherein two molecular proportions of an halide of 2:3-phthaloyl-pyrrocoline-1-carboxylic acide of the general formula

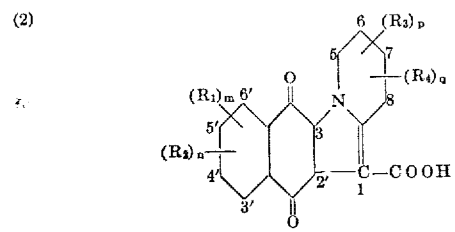

(the numbering of the pyrrocoline ring being that of Patterson's Ring Index), in which $R_1$, $R_2$, $R_3$, $R_4$, *m*, *n*, *p* and *q* have the meanings given above, are condensed with one molecular proportion of an aromatic diamine which contains at least two carbocyclic rings condensed with one another and is free from groups imparting solubility in water for example sulfonic and carboxylic acid groups.

In the phthaloyl-pyrrocoline carboxylic acids of the Formula 2 $R_3$ and $R_4$ advantageously represent hydrogen atoms or simple substituents, such as halogen atoms or lower alkyl groups, or $R_3$ and $R_4$ when bound to vicinal carbon atoms of the pyridine ring, may form together with those carbon atoms an alicyclic, heterocyclic, or aromatic ring. $R_1$ and $R_2$ advantageously represent hydrogen atoms or halogen atoms, for example, chlorine or bromine atoms.

The 2:3-phthaloyl-pyrrocoline carboxylic acids of the Formula 2 can be obtained, for example, by the process of U.S. Patent No. 2,877,230, patented March 10, 1959 by Robert S. Long et al. by condensing a 2:3-dihalogen-naphthoquinone with an acetoacetic acid alkyl ester and pyridine or a substitution product thereof, for example, β- or γ-picoline, and hydrolising to the carboxylic acid the alkyl ester so obtained. As naphthoquinones there may be mentioned owing to the ease with which it can be obtained, more especially, 2:3-dichloro-naphthoquinone. Alternatively, there may be used 2:3:5- or 2:3:6-trichloro-naphthoquinone, 2:3-dibromo-naphthoquinone or 2:3:6:7-tetrabromo-naphthoquinone.

2

There are advantageously used the chlorides of the 2:3-phthaloyl-pyrrocoline carboxylic acids. The latter can be obtained by treating the carboxylic acids in known manner with an acid-chlorinating agent, for example, phosphorus trichloride, phosphorus pentachloride or phosphorus oxychloride, and more especially thionylchloride. The treatment with the aforesaid acid-halogenating agents is advantageously carried out in an inert organic solvent, such as dimethyl formamide, a chlorobenzene, for example, mono- or di-chlorobenzene, toluene, xylene, or nitrobenzene. When the last mentioned solvent is used the reaction can be accelerated by the addition of a small proportion of dimethyl formamide.

For making the carboxylic acid halides it is of advantage first to dry the carboxylic acid which has been prepared in an aqueous medium or to free it from water azeotropically by boiling in an organic solvent. This azeotropic drying may, if desired, be carried out immediately before the treatment with an acid-halogenating agent.

As aromatic diamines which contain at least two carbocyclic rings condensed together there may be mentioned diamino naphthalenes, for example, 1:3-, 1:4-, 1:5-, 1:6-, 1:8-, 2:6- or 2:7-diaminonaphthalene, or diaminochrysenes, for example, 2:8-diaminochrysene, 2:7-diaminofluorene, 2:7-diamino-fluorenone, 1:4- 1:5-, 2:6-, 2:7-diamino-anthroquinone, 1:5-dichloro-2:6-diamino-anthraquinone, 4:8-dichloro-1:5-diamino-anthroquinone, 2:6-dibromo-1:5-diamino-anthroquinone, 3:7-dibromo-2:6-diamino-anthraquinone, 1:5-dibromo-2:6-diamino-anthraquinone, 3:6-dibromo-2:7-diamino-anthraquinone, 1:5-dinitro-2:6-diamino-anthraquinone, 1:5-diamino-4:8-dihydroxy-anthaquinone, 1:5-diamino-4-hydroxy-anthraquinone, 1:8-diamino-3:6-dichlor-anthraquinone, 1:8-diamino-4:5-dihydroxy-anthraquinone, 5-methyl-1:4-diamino-anthraquinone, 2:3-dichloro-1:4-diamino-anthraquinone, 2:4:6:8-tetrachloro-1:5-diaminoanthraquinone, 2:4:6:8-tetrabromo-1:5-diaminoanthraquinone, 1:3:5:7-tetrachloro-1:5-diamino-anthraquinone, 1:3:5:7-tetrabromo-2:6-diamino-anthraquinone, 1:4:5:8-tetraamino-anthraquinone, 1:2:5:6-tetraaminoanthraquinone, 2:6-dimethyl-anthraquinone, 2:7-dimethyl-anthraquinone, 2:5 and/or 2:7-diaminophenanthraquinone, diaminoanthraquinone, 3:6-diaminophenanthrenquinone, 5:10-diaminopyrene-3:8-quinone, diaminoacedianthrone (obtainable, for example, by nitrating and reducing acedianthrone), perylee-3:4:9:10-tetracarboxylic acid-di-(3-aminophenylimide), perylene-3:4:9:10-tetracarboxylic acid-di-(4-aminophenylimide), perylene-3:4:9:10-tetracarboxylic acid di-para-amino-diphenylimide and 6:7-dimethoxy-perylene-3:4:9:10-tetracarboxylic. acid-di-(aminophenylimide).

The condensation of the phthaloyl-pyrrocoline carboxylic acid halides with the diamines is advantageously carried out in an anhydrous medium. Under these conditions the condensation generally takes place surprisingly easily at temperatures within the boiling ranges of ordinary organic solvents, toluene, monochlorobenzene, dichlorobenzene, trichlorobenzene, nitrobenzene and the like. For accelerating the reaction there may be used an acid-binding agent, such as anhydrous sodium-acetate, pyridine or anhydrous ammonia. The dyestuffs are generally obtained in very good yield and in a pure state. For making especially pure dyestuffs it may be of advantage first to separate the acid chlorides of the carboxylic acids and, if desired, to recrystallise them. In most cases, especially when thionyl chloride is used as acid-halogenating agent, it is possible without harm, and in some cases even with an improved result, to dispense with isolation of the acid chloride and to proceed with the condensation immediately after the acid chlorides have been made.

The dyestuffs of this invention are useful for dyeing a very wide variety of materials, for example as vat dyestuffs for dyeing cellulose fibers or animal fibers, such as wool or silk, or synthetic fibers such as fibers of polyamides or polyesters. The dyestuffs of the invention can be sulfonated and used in the sulfonated condition for dyeing the aforesaid fibers. They are also useful as pigments for all uses of pigments, for example, in the so-called pigment printing method, that is to say, a method of printing in which a pigment is fixed by means of a suitable adhesive, such as casein, a hardenable synthetic resin, especially a urea- or melamine-formaldehyde condensation product, or a solution or emulsion of polyvinyl chloride or polyvinyl acetate or other emulsion, for example, an oil-in-water or water-in-oil emulsion, on a substratum, especially on a textile fiber, but if desired, on another flat structure such as paper, for example, wall paper, or a fabric of glass fibers. The pigments are also useful for other purposes, for example, in a finely dispersed form for coloring artificial silk of viscose or a cellulose ether or ester or of a polyamide or polyurethane in the spinning mass, and also for making colored lacquers or lacquer-formers, solutions or products of acetyl-cellulose, nitro-cellulose, natural substances of high molecular weight, such as rubber or casein, or synthetic resins, such as polymerization resins, for example, polyvinyl chloride, polyethylene, polypropylene, polystyrene, or condensation resins, for example, aminoplasts, phenoplasts and also silicone or silicone resins. They can also be used with advantage for making color pencils, cosmetic preparations or laminated plates.

By virtue of their chemical inertness and good resistance to heat the pigments of this invention can be dispersed in the normal manner in compositions or products of the above kind, and this can be achieved with advantage at a stage in the manufacture of such compositions or products before they have reached their final form. The pigments can be converted by the known conditioning methods into a finely divided form.

The operations necessary for shaping, such as spinning, pressing, hardening, casting, sticking or the like can then be carried out in the presence of the pigments.

The pigments of this invention are distinguished by their excellent fastness to light and migration.

The following examples illustrate the invention, the parts and percentages being by weight.

*Example 1*

30.9 parts of 2:3-phthaloylpyrrocoline-1-carboxylic acid chloride (prepared according to U.S. Patent No. 2,877,230, patented March 10, 1959 by Robert S. Long et al. by heating 2:3-dichloronaphthoquinone, aceto-acetic acid ester and pyridine, hydrolysing the resulting 2:3-phthaloylpyrrocoline-1-carboxylic acid ethyl ester to form the carboxylic acid and reacting the latter with thionyl chloride) are suspended at 115° C. in 700 parts of anhydrous ortho-dichlorobenzene; after about 20 minutes a clear solution is obtained into which, in the course of about 5 minutes, a solution heated at 120° C. of 7.9 parts of 1:5-diaminonaphthalene in 100 parts of anhydrous ortho-dichlorobenzene and 2.5 parts of anhydrous pyridine is added. The mixture is heated to 140 to 145° C. and maintained at this temperature for 10 hours, then allowed to cool to 100° C., filtered, and the resulting pigment is washed with ortho-dichlorobenzene heated at 100° C. until the solvent runs off practically colorless. The product is washed with a small amount of cold methanol and thereupon with hot water. The violet pigment is dried in vacuo at 90 to 100° C. When used for coloring polyvinyl chloride foils, it yields a violet coloration which has good fastness to migration.

When 1:5-diaminonaphthalene is replaced by an equivalent amount of 2:8-diaminochrysene, the resulting pigment colors polyvinyl chloride foils brown shades.

By using diaminofluoranthrene of the formula

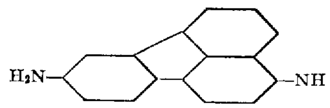

a brown shade is obtained.

With 3:8-diaminopyrene a violettish brown is obtained and with 1:5-diamino-2:6-dimethoxynaphthalene a neutral brown shade.

*Example 2*

34.4 parts of 4'- or 5'-chlorophthaloylpyrrocoline-carboxylic acid chloride, dissolved in 750 parts of anhydrous ortho-dichlorobenzene at 115° C., are treated at 120° C. with a solution of 7.9 parts of 1:5-diaminonaphthalene in 100 parts of anhydrous ortho-dichlorobenzene and 2.5 parts of anhydrous pyridine. The resulting pigment colors polyvinyl chloride foils violet shades having good fastness to migration.

When 1:5-diaminonaphthalene is replaced by an equivalent amount of diaminofluoranthene, a brown shade is obtained and with 3:8-diaminopyrene a yellowish brown.

*Example 3*

2.4 parts of 1:5-diaminoanthraquinone and 6.2 parts of 2:3-phthaloylpyrrocoline-carboxylic acid chloride are added to 100 parts of nitrobenzene. The mixture is heated with stirring to 190 to 200° C. and maintained for about one hour at this temperature. After cooling, the condensation product is suctioned off, washed with alcohol and dried, to yield 7.5 parts of an orange dyestuff which dyes cotton from a reddish brown vat very pure orange tints having good properties of fastness.

When 1:5-diaminoanthraquinone is replaced by other vattable diamines, similar dyestuffs are obtained whose vat colors and shades of dyeings on cotton are shown in the following table:

| No. | Vattable diamino compound | Color of vat | Shade of dyeing on cotton |
|---|---|---|---|
| 1 | 1:4-diaminoanthraquinone | reddish brown. | brown orange. |
| 2 | 1:6-diaminoanthraquinone | do | orange. |
| 3 | 1:8-diaminoanthraquinone | do | yellow orange. |
| 4 | 2:6-diaminoanthraquinone | brown | red orange. |
| 5 | 2:7-diaminoanthraquinone | do | Do. |
| 6 | 1:8-diamino-3:6-dichloroanthraquinone | reddish brown. | yellow orange. |
| 7 | 1:3:5:7-tetrachloro-2:6-diaminoanthraquinone. | do | orange. |
| 8 | 1:5-diamino-4:8-dihydroxy-anthraquinone | do | violet. |
| 9 | 4:4'-diamino-1:1'-dianthraquinoylimide-carbazole. | brown orange. | currant. |
| 10 | 5:5'-diamino-1:1'-dianthraquinoylimide carbazole. | do | coppery red. |
| 11 | diamino-acedianthrone | navy | brown. |

When instead of the chloride of 2:3-phthaloylpyrrocoline-carboxylic acid the chloride of the 4'-chloro derivative of said acid is used, dyestuffs having similar properties are obtained.

*Example 4*

5.7 parts of finely distributed perylene-3:4:9:10-tetracarboxylic acid-N:N' - di - meta - aminophenylimide are heated with stirring to 180° C. in 210 parts of nitrobenzene. 6.2 parts of 2:3-phthaloyl-pyrrocoline-carboxylic acid chloride are added and the mixture is heated for another 3 hours at 190 to 200° C. After cooling, the resulting condensation product is suctioned off, washed with alcohol and dried, to yield 9 parts of a red dyestuff which dyes cotton from a ruby vat strong ruby tints having good properties of fastness.

When the condensation product of perylenetetracarboxylic acid dianhydride with 1:3-diaminobenzene is replaced by its condensation product with 1:4-diaminobenzene or benzidine, dyestuffs having similar properties are obtained.

*Example 5*

65 parts of polyvinyl chloride, 35 parts of dioctylphthalate and 0.2 part of the pigment obtained as described in paragraph 1 of Example 1 are stirred together and then rolled to and fro between the two rollers of a calender for 7 minutes at 145° C. The resulting red foil has good fastness to light and migration. When, in addition to the amount of color pigment specified above, there are used 5 parts of titanium dioxide, a violet pastel shade is obtained.

*Example 6*

0.25 part of the dyestuff obtained in Example 1 are ground for 24 hours in a rod mill with 40 parts of an alkydmelamine stoving lacquer containing 50% of solids, and 4.75 parts of titanium dioxide. The resulting lacquer is brushed in a thin layer on an aluminum foil and stoved for one hour at 120° C. The resulting violet lacquer coat has good fastness to light.

*Example 7*

For the manufacture of a laminate the following component plies are prepared:

(*a*) Thick paper of unbleached sulfate cellulose (so-called Kraft paper) is impregnated with an aqueous phenolformaldehyde resin solution, squeezed and dried.

(*b*) Paper of pure, chemically bleached cellulose, containing zinc sulfide or titanium dioxide as filler, is impregnated with an aqueous solution of 50% strength of dimethylol melamine, squeezed and dried at 100° C.

(*c*) 400 parts of a fancy paper of bleached cellulose, containing zinc sulfide or titanium dioxide as filler, are disintegrated in a Hollander with 10,000 parts of water. 30 parts of the pigment obtained as described in Example 1 are incorporated in the pulp thus prepared. To fix the pigment, 16 parts of aluminum sulfate are added. The colored fancy paper is impregnated in an aqueous solution of 50% strength of dimethylol melamine, squeezed and dried at 100° C.

(*d*) Depending on the desired quality of the laminate, the fancy paper is protected with tissue paper of bleached special cellulose, weighing 40 grams per square meter. The tissue paper is likewise impregnated with an aqueous solution of 50% strength of dimethylolmelamine, squeezed and dried at 100° C.

Equal pieces of the material prepared in this manner, measuring for example 2.75 x 1.25 meters, are placed one on top of the other in the following order: 3 to 5 sheets of paper (*a*), 1 sheet of paper (*b*), 1 sheet of paper (*c*) and, in the given case, 1 sheet of paper (*d*), and the sandwich is then compressed between mirror-chromed platens for 12 minutes at 140 to 150° C. under a pressure of 100 kg. per sq. cm., cooled to 30° C., and the laminate thus produced is removed from the press. On one side it is of a violet color which has good resistance to light.

*Example 8*

1 part of the dyestuff obtained as described in Example 3 is vatted in 100 parts of water containing 4 parts by volume of sodium hydroxide solution of 30% strength with 2 parts of sodium hydrosulfite at 45° C. The resulting stock vat is added to a solution of 4 parts by volume of sodium hydroxide solution of 30% strength and 2 parts of sodium hydrosulfite in 2000 parts of water. 100 parts of cotton are dyed in the resulting dyebath for one hour at 40 to 50° C. in the presence of 10 parts of sodium chloride. The cotton is then squeezed, oxidized in air, rinsed, acidified, once more rinsed and then soaped at the boil. The resulting orange dyeing has good fastness properties.

What is claimed is:

The dyestuff of the formula

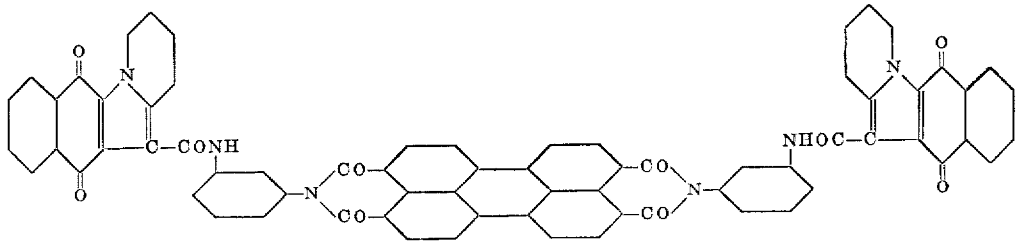

References Cited in the file of this patent

UNITED STATES PATENTS

| | | |
|---|---|---|
| 2,772,274 | Schmidt-Nickels et al. | Nov. 27, 1956 |
| 2,773,873 | Randall et al. | Dec. 11, 1956 |

UNITED STATES PATENT OFFICE

CERTIFICATE OF CORRECTION

Patent No. 3,088,949 May 7, 1963

Eduard Moser et al.

It is hereby certified that error appears in the above numbered patent requiring correction and that the said Letters Patent should read as corrected below.

Column 2, lines 40, 41 and 42, for "-anthroquinone", each occurrence, read -- -anthraquinone --; line 60, for "perylee-" read -- perylene- --; column 4, lines 14 to 17, for the right-hand portion of the formula reading "-NH" read -- $-NH_2$ --.

Signed and sealed this 21st day of April 1964.

(SEAL)
Attest:
ERNEST W. SWIDER

Attesting Officer

EDWARD J. BRENNER
Commissioner of Patents